(12) United States Patent
Ogata

(10) Patent No.: US 7,729,226 B2
(45) Date of Patent: Jun. 1, 2010

(54) WAVEFRONT ABERRATION COMPENSATION ELEMENT, OPTICAL PICKUP, AND OPTICAL DISK APPARATUS

(75) Inventor: Tetsuya Ogata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1150 days.

(21) Appl. No.: 10/957,674

(22) Filed: Oct. 5, 2004

(65) Prior Publication Data

US 2005/0174918 A1    Aug. 11, 2005

(30) Foreign Application Priority Data

Oct. 6, 2003  (JP)  ............... 2003-346674
Jul. 8, 2004  (JP)  ............... 2004-201767

(51) Int. Cl.
    *G11B 7/00*    (2006.01)
(52) U.S. Cl. ................................. 369/112.02
(58) Field of Classification Search ............ None
    See application file for complete search history.

(56) References Cited

U.S. PATENT DOCUMENTS

| | | | |
|---|---|---|---|
| 6,567,365 B1 * | 5/2003 | Hendriks et al. | 369/112.02 |
| 6,925,039 B2 * | 8/2005 | Yanagawa et al. | 369/44.32 |
| 7,085,203 B2 | 8/2006 | Shiono et al. | |
| 7,324,424 B2 | 1/2008 | Kim et al. | |
| 7,623,291 B2 * | 11/2009 | Sato | 359/569 |
| 2003/0053393 A1 * | 3/2003 | Shimano et al. | 369/112.02 |
| 2003/0072047 A1 * | 4/2003 | Funato et al. | 359/15 |
| 2003/0214898 A1 | 11/2003 | Ogata et al. | |
| 2004/0013076 A1 | 1/2004 | Funato et al. | |
| 2004/0125454 A1 | 7/2004 | Kawasaki et al. | |

FOREIGN PATENT DOCUMENTS

| | | |
|---|---|---|
| JP | 10-334504 | 12/1998 |
| JP | 2895150 | 3/1999 |
| JP | 2001-043559 | 2/2001 |
| JP | 3236203 | 9/2001 |
| JP | 2001-318231 | 11/2001 |
| JP | 2001-319368 | 11/2001 |
| JP | 2003-281775 | 10/2003 |

* cited by examiner

*Primary Examiner*—Joseph H Feild
*Assistant Examiner*—Parul Gupta
(74) *Attorney, Agent, or Firm*—Dickstein Shapiro LLP

(57) ABSTRACT

A wavefront aberration compensation element includes a wavelength selection phase plate having a plurality of phase steps having various thicknesses at various areas, a liquid crystal layer for obtaining a prescribed wavefront aberration, and a pair of first and second electrode layers having the liquid crystal layer disposed therebetween, wherein either one of the wavelength selection phase plate and the pair of first and second electrode layers having the liquid crystal layer disposed therebetween is stacked on the other.

14 Claims, 8 Drawing Sheets

WAVEFRONT ABERRATION COMPENSATION ELEMENT, OPTICAL PICKUP, AND OPTICAL DISK APPARATUS

BACKGROUND OF THE INVENTION

1. Field of the Invention

This invention relates to a wavefront aberration compensation element, an optical pickup, and an optical disk apparatus for accommodating light sources of various wavelengths.

2. Description of the Related Art

An optical disk apparatus records information on a recording surface of an optical disk with spiral or concentric tracks formed thereto, and performs operations of recording/reproduction/erasing information based on the light directed to and reflected from the recording surface of the optical disk.

Typically, an optical system of an optical pickup includes a light source 101 and an objective lens 102 as shown in a schematic diagram of FIG. 9. In order to control the fine spot on an information recording medium 103, the optical system of the optical pickup is provided with a lens actuator 104 for executing focus and track control of the objective lens 102. Numeral 105 is a detection/separation part (beam splitter) for separating reflected light of the information recording medium 103 from incident light, and guiding the reflected light to a light receiving element 106.

As for the kinds of optical disks provided in recent years, there are, for example, a DVD (Digital Versatile Disc) having a considerably larger memory capacity than a CD (Compact Disc), and a recording/reproduction disk using blue laser. Two standards of the recording/reproduction disks using blue laser are proposed, one having a substrate thickness of 0.1 mm (Blu-ray) and the other having a substrate thickness of 0.6 mm (HD-DVD). In recording/reproducing information, a light source with a wavelength of 785 nm is used for the CD, a light source with a wavelength of 660 nm is used for the DVD, and a light source with a wavelength of 405 nm is used for the recording/reproduction disk using blue laser. Relationships between the thickness of a disk substrate, the wavelength of a light source, and the NA (Numerical Aperture) of an objective lens are shown in Table 1.

TABLE 1

|  |  | DVD | CD |
|---|---|---|---|
|  | HD-DVD |  |  |
| disk thickness | 0.6 mm | 0.6 mm | 1.2 mm |
| light source wavelength | 405 nm | 660 nm | 785 nm |
| objective lens NA | 0.6-0.7 | 0.6-0.65 | 0.3-0.55 |
|  | Blu-ray |  |  |
| disk thickness | 0.1 mm | 0.6 mm | 1.2 mm |
| light source wavelength | 405 nm | 660 nm | 785 nm |
| objective lens NA | 0.85 | 0.6-0.65 | 0.3-0.55 |

Meanwhile, a typical objective lens is designed to eliminate wavefront aberration created by the thickness of the disk substrate. Accordingly, wavefront aberration is caused by disk substrates having different thicknesses and/or optical pickups for different wavelengths. Therefore, recording/reproduction/erasing cannot be suitably performed.

For example, as shown in FIG. 10, a wavefront aberration is created in a case where a parallel light of a DVD is incident on an objective lens corresponding to the 0.1 mm disk thickness of the Blu-ray standard. Typically, in order to reduce the spot diameter of a light condensed with an objective lens, it is preferred to restrict the wavefront aberration to an rms of 0.07 $\lambda$ or less (Marechal Criterion). However, the wavefront aberration shown in FIG. 10 is a large wavefront aberration of 0.7 $\lambda$. With such an optical pickup, the spot diameter cannot be reduced, and recording/reproduction/erasing cannot be suitably performed.

In order to solve this problem, the following conventional technologies, enabling recording/reproduction/erasing by selectively compensating for wavefronts with respect to disks having different thicknesses, are proposed.

As shown in Japanese Laid-Open Patent Application No. 10-334504, the first conventional example uses a wavelength selection phase plate. This example has one optical system for emitting and receiving a laser beam with a prescribed wavelength and another optical system for emitting and receiving a laser beam with another prescribed wavelength. Furthermore, this example is provided with a light combining/separating part (interference filter) for combining the laser beams emitted from the semiconductor lasers of each of the optical systems and thus separating the light reflected from an optical recording medium, to thereby allow light to be guided to either one of the optical detectors in the optical systems. Furthermore, this example is provided with a wavelength selection phase plate disposed between the interference filter and an objective lens for changing the phase distribution of the transmission wavefront with respect to either one of first and second semiconductor lasers. Accordingly, this example enables reproduction of disks having different thicknesses (substrate thicknesses). Furthermore, this example enables a satisfactory S/N and jitter result to be obtained during reproduction. Furthermore, this example enables an optical head apparatus to obtain a sufficient output and a peak strength during recording.

As shown in Japanese Registered Patent No. 02895150, the second example uses a liquid crystal element for compensating for wavefront aberration. This example is an image formation optical system having an aberration compensation mechanism which obtains compensation signals by detecting the amount of aberration, and controls the aberration compensation mechanism based on the detected amount of aberration. In this example, a liquid crystal element, being divided into panels, is used as the aberration compensation mechanism, in which liquid crystal panels are driven in accordance with detected aberration patterns. This allows wavefront aberration of the image formation optical system to be compensated for.

As shown in Japanese Registered Patent No. 03236203, the third example performs spherical aberration compensation by using divergent light. In this example employing an optical head with light sources of different wavelengths, the distance between a light source of a long wavelength and an objective lens is shortened, so that light is incident on an objective lens in a diverging manner, to thereby create a negative spherical aberration. Since the objective lens is designed to reduce the spherical aberration with respect to a light source of a short wavelength, a positive spherical aberration is created when a short wavelength light is incident to the objective lens. Accordingly, the spherical aberration of the optical head can be reduced by the positive spherical aberration and the negative spherical aberration offsetting each other, thereby obtaining an optical head having little spherical aberration with respect to both light sources of long and short wavelengths.

Next, problems of the above-described conventional examples are described in a case of compensating for wavefront aberration for a DVD by using an objective lens with a substrate thickness of 0.1 mm according to the Blu-ray standard.

First, the first example using the wavelength selection phase plate is described. FIG. 11 is a diagram showing four levels of spherical aberrations before and after compensation. As shown with the line indicating "before compensation", the levels of the phase distribution compensation amount of the transmission wavefront is to be minutely defined in order to compensate for large wavefront aberrations. However, since the pupil diameter is constant, minutely defining the levels narrows the width of each level and causes difficulty in manufacturing (processing). Furthermore, in the wavefront aberration after compensation, a serrated wavefront aberration remains and an rms value of 0.07 λ or less cannot be obtained.

In addition, with such an optical element being manufactured mainly with glass or molded plastic, the refractive index is drastically changed by wavelength changes due to fluctuations in wavelengths and changes in atmospheric temperature, and changes in wavefront aberrations (chromatic aberrations) are caused by phase difference. Furthermore, with such a phase conversion element, newly created wavefront aberrations due to axial deviation between the phase conversion element and the optical system cannot be compensated for.

Next, the second example using the phase conversion liquid crystal element is described. For example, in a case where the double refraction of a liquid crystal element is 0.2, the thickness of the liquid crystal layer is 5 μm, and the applied voltage is 4V, the obtained phase difference is 0.7 μm (=1 λ at 660 nm) (applied to a liquid crystal of an optical disk head in FIG. 12). Considering that the refractive index is 0.2 to 0.25, and that the power source of the optical pickup is mainly 5V, the wavefront aberration compensation of the liquid crystal element has a limit of 1 λ. That is, the compensation for the wavefront aberration using the liquid crystal element is unsuitable for large aberrations.

Next, the third example of compensating for spherical aberration using divergent rays is described. By setting the divergent point of the DVD for creating divergent rays with respect to the objective lens, the spherical aberration of the DVD can be reduced as shown in FIG. 13. However, since the divergent point of the DVD is fixed, the layout of the optical system is restricted. Furthermore, a residual aberration is caused from differences in magnification of the optical system, and the rms value of 0.07 λ or less cannot be obtained.

SUMMARY OF THE INVENTION

It is a general object of the present invention to provide a wavefront aberration compensation element, an optical pickup, and an optical disk apparatus that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a wavefront aberration compensation element, an optical pickup, and an optical disk apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a wavefront aberration compensation element including: a wavelength selection phase plate having a plurality of phase steps having various thicknesses at various areas; a liquid crystal layer for obtaining a prescribed wavefront aberration; and a pair of first and second electrode layers having the liquid crystal layer disposed therebetween; wherein either one of the wavelength selection phase plate and the pair of first and second electrode layers having the liquid crystal layer disposed therebetween is stacked on the other.

In the wavefront aberration compensation element according to an embodiment of the present invention, a phase step of a single area of the wavelength selection phase plate may satisfy a relation of "nd=mλ1" with respect to a light beam of a predetermined wavelength, wherein "d" represents the phase step of a single area of the wavelength selection phase plate, "λ1" represents the light beam of a predetermined wavelength, "n" represents a refractive index, and "m" represents a given integral number.

In the wavefront aberration compensation element according to an embodiment of the present invention, the liquid crystal layer may be arranged in correspondence with the various areas in the wavelength selection phase plate, and provides a wavefront aberration in an opposite direction with respect to a residual aberration generated by a light transmitted through the wavelength selection phase plate.

In the wavefront aberration compensation element according to an embodiment of the present invention, the liquid crystal layer may be arranged in correspondence with the various areas in the wavelength selection phase plate, and provides a wavefront aberration in an opposite direction with respect to a chromatic aberration generated by deviation of a wavelength of a light transmitted through the wavelength selection phase plate.

In the wavefront aberration compensation element according to an embodiment of the present invention, different amounts of voltages may be applied to the liquid crystal layer disposed between the pair of the first and second electrode layers in correspondence with the various areas of the wavelength selection phase plate.

In the wavefront aberration compensation element according to an embodiment of the present invention, the liquid crystal layer may have a refractive index which differs in correspondence with the various areas of the wavelength selection phase plate.

In the wavefront aberration compensation element according to an embodiment of the present invention, the liquid crystal layer may have a thickness which differs in correspondence with the various areas of the wavelength selection phase plate.

Furthermore, the present invention provides an optical pickup including a plurality of light sources for emitting luminous fluxes of various wavelengths; an objective lens for condensing a band of rays of the luminous flux onto an information recording medium; an illumination optical system for combining the luminous flux emitted from each of the light sources and converging the luminous fluxes to the objective lens; a receiving element for detecting light reflected from the information recording medium; a detection optical system for guiding the reflected light to the receiving element; and a wavefront aberration compensation element disposed in an optical path between the objective lens and the illumination optical system, the wavefront aberration compensation element including a wavelength selection phase plate having a plurality of phase steps having various thicknesses at various areas, a liquid crystal layer for obtaining a prescribed wavefront aberration, and a pair of first and second electrode layers having the liquid crystal layer disposed therebetween, wherein either one of the wavelength selection phase plate and the pair of first and second electrode layers having the liquid crystal layer disposed therebetween is stacked on the other.

In the optical pickup according to an embodiment of the present invention, the optical pickup may further include: a wavelength detection element disposed in at least one of the illumination optical system and the detection optical system for detecting an amount of change of a wavelength of the light source; and a liquid crystal control part for controlling a driving amount of the liquid crystal layer in the wavefront aberration compensation element in correspondence with an output of the wavelength detection element.

In the optical pickup according to an embodiment of the present invention, the wavelength selection phase plate of the wavefront aberration compensation element may be set to allow a phase distribution of a transmission wavefront to change only with respect to the luminous flux having a longer wavelength among the luminous fluxes having two or more different wavelengths.

In the optical pickup according to an embodiment of the present invention, the luminous flux emitted from the light sources may include a luminous flux with a short wavelength of 380-420 nm, a luminous flux with a medium wavelength of 640-680 nm, and a luminous flux with a long wavelength of 760-800 nm, wherein the wavelength selection phase plate of the wavefront aberration compensation element is set to allow a phase distribution of a transmission wavefront to change with respect to the luminous flux with the medium wavelength, but not with respect to the luminous flux with the short wavelength or the luminous flux with the long wavelength, wherein the illumination optical system for the luminous flux with the long wavelength is set to allow the luminous flux with the long wavelength to be incident on the objective lens in a diverging manner.

In the optical pickup according to an embodiment of the present invention, the liquid crystal layer of the wavefront aberration compensation element may compensate for a spherical aberration with respect to the luminous flux with the long wavelength being incident on the objective lens.

In the optical pickup according to an embodiment of the present invention, the illumination optical system for the luminous flux with the long wavelength may be set to allow the luminous flux with the long wavelength to be incident on the objective lens in a substantially parallel manner.

In the optical pickup according to an embodiment of the present invention, the optical pickup may further include an actuator moving part for driving the objective lens in a focus direction and a tracking direction, the actuator moving part being formed into a united body with the wavefront aberration compensation element and the objective lens.

In the optical pickup according to an embodiment of the present invention, the wavefront aberration compensation element may be disposed in an optical path of the illumination optical system which is not included in the actuator moving part.

Furthermore, the present invention provides an optical disk apparatus including the optical pickup according to an embodiment of the present invention.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to the accompanying drawings.

Figure 1:
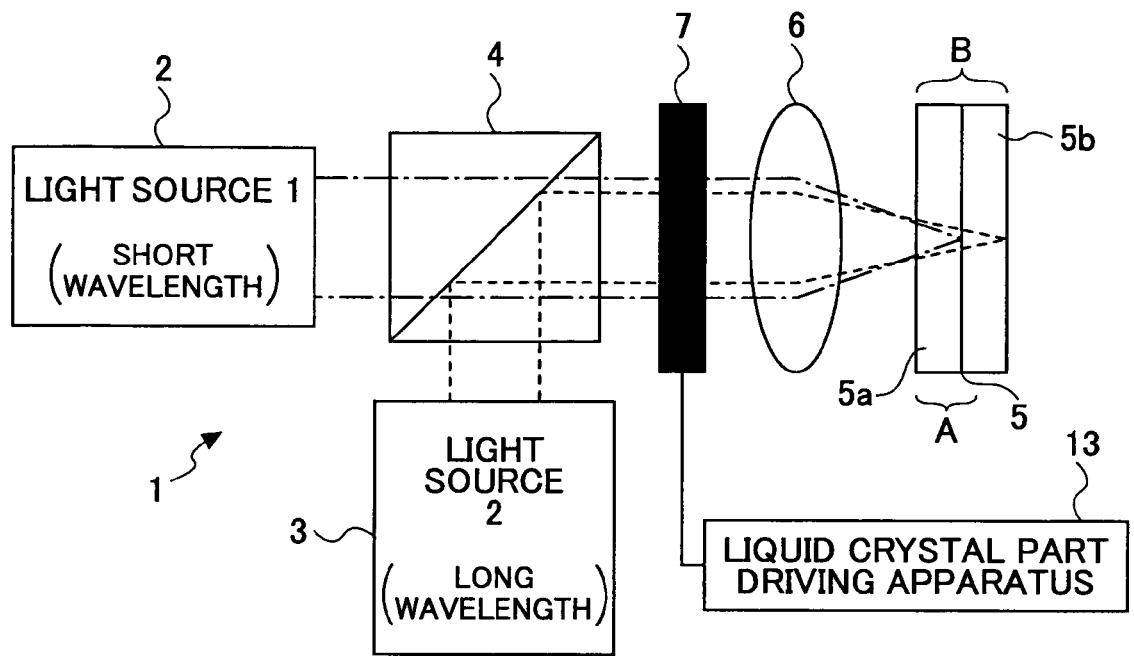
FIG. 1 is a schematic drawing showing a basic structure of an optical pickup in an optical disk apparatus according to an embodiment of the present invention.

FIG. 1 is a schematic diagram showing a basic structure of an optical pickup 1 of an optical disk apparatus according to an embodiment of the present invention. The optical pickup 1 has a light source 2 for emitting a luminous flux (bundle of rays) of a relatively short wavelength, a light source 3 for emitting a luminous flux of a relatively long wavelength, and a wavelength combining prism 4 for combining the bundles of rays emitted from the light sources 2 and 3 into the same optical path. A common objective lens 6 for converging the bundles of rays onto an information recording medium 5 is disposed on the optical path. In the bundle of rays converged by the objective lens 6, the bundle of rays from the light source 2 forms a beam spot on a surface of an information recording medium part 5a having a substrate thickness A, and the bundle of rays from the light source 3 forms a beam spot on a surface of an information recording medium part 5b having a substrate thickness B.

A wavefront aberration compensation element 7 is disposed on the optical path between the wavelength combining prism 4 and the objective lens 6. The objective lens 6 is designed to minimize wavefront aberration with respect to the insides of the light sources 2 and 3, the wavelength of the light source 2, and the substrate thickness A, but is unable to reduce the wavefront aberration with respect to the wavelength of the light source 3 and the substrate thickness B. Accordingly, the wavefront aberration compensation element 7 is structured as a wavefront aberration compensation element capable of effective wavelenghth selection in a case where a large wavefront aberration is created with respect to the wavelength of the light source 3 and the substrate thickness B.

Figure 2:
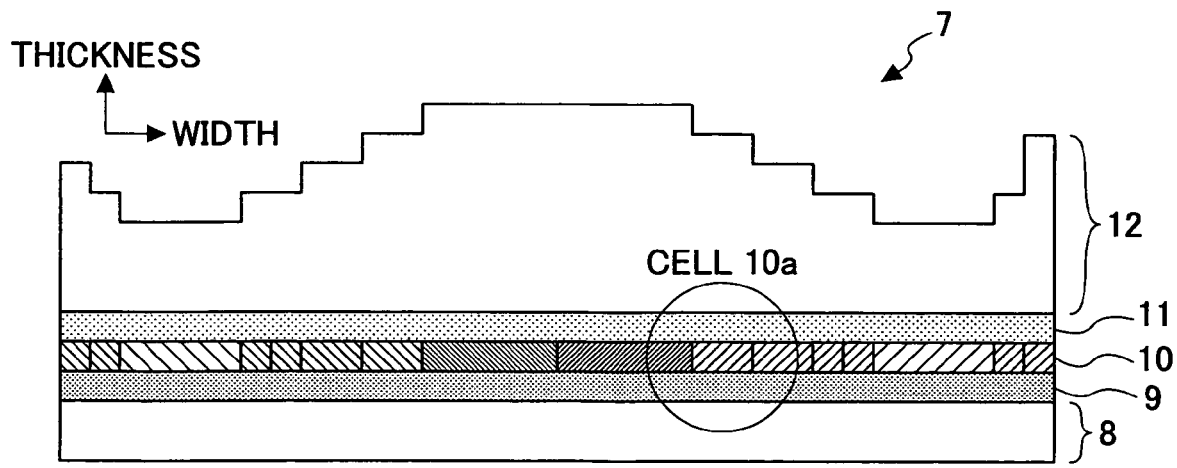
FIG. 2 is cross-sectional diagram showing an example of a wavefront aberration compensation element according to an embodiment of the present invention.

An exemplary structure of the wavefront aberration compensation element 7 according to an embodiment is described with reference to the cross-sectional diagram of FIG. 2. The wavefront aberration compensation element 7 has a layered structure including a glass layer 8, an electrode layer 9, a liquid crystal layer 10, an opposite electrode layer 11, and a wavelength selection phase plate 12.

The wavelength selection phase plate 12 has a thickness formed in a stair-like manner, in which plural steps (levels) of different phase differences are formed in accordance with area (width). The differences between levels (phase difference) d are integral multiples with respect to a wavelength $\lambda 1$ of the light source 2. This relation can be described with a formula as:

$$nd = m\lambda 1$$

wherein "n" represents refractive index, and "m" represents a given constant. Accordingly, there is no phase difference with respect to the bundle of rays from the light source 2.

Figure 14:
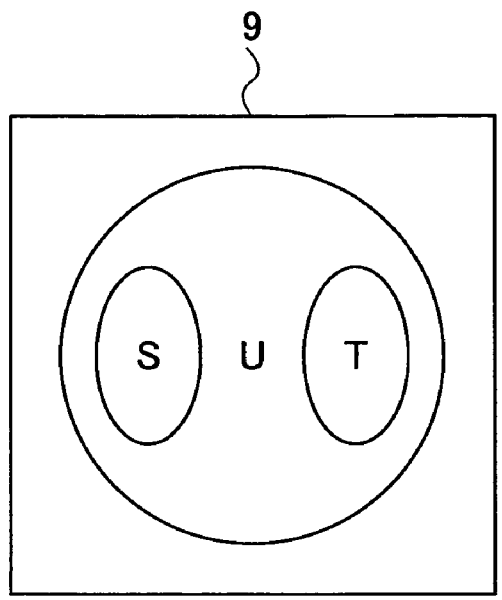
FIG. 14 is a diagram showing an electrode pattern in a case of compensating coma aberration in a liquid crystal layer according to an embodiment of the present invention.

By taking a given aberration compensation pattern of the electrode layer 9, the wavefront aberration(s) occurring in the optical pickup 1 can be compensated for. As for the wavefront aberration occurring in the optical pickup 1, there is, for example, a coma aberration due to inclination of the optical disk 5 and/or astigmatism due to inclination of the objective lens 6. In a case of compensating for aberrations that are asymmetric with respect to a center point of the bundle of rays, the pattern of the electrode layer 9 is set according to the shape of the aberration targeted to be compensated, for example, in a case of compensating for the coma aberration caused by inclination of the optical disk 5, the pattern of the electrode layer 9 is formed in a manner shown in FIG. 14. By controlling the voltage applied to S and T shown in FIG. 14, the distribution of the refractive index in a liquid crystal part changes, and phase difference is created, to thereby achieve compensation for the coma aberration. The aberration compensation pattern by the liquid crystal element can be applied to both the light sources 1 and 2.

Figure 3:
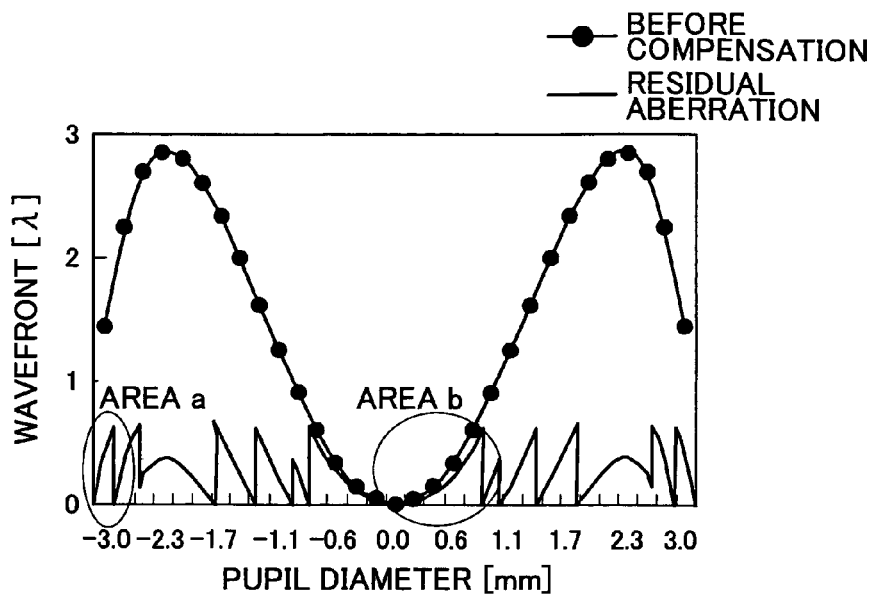
FIG. 3 is a diagram showing a residual aberration by a wavelength selection phase plate according to an embodiment of the present invention.

Meanwhile, in a case where the bundle of rays from the light source 3 is incident on the wavelength selection phase plate 12, a stair-like phase difference between areas is created, and the transmission wavefront becomes a serrated non-consecutive wavefront aberration as shown in FIG. 3. This wavefront aberration is referred to as residual aberration due to the wavelength selection phase plate 12. Next, a method of compensating for the residual aberration is described.

Figure 15:
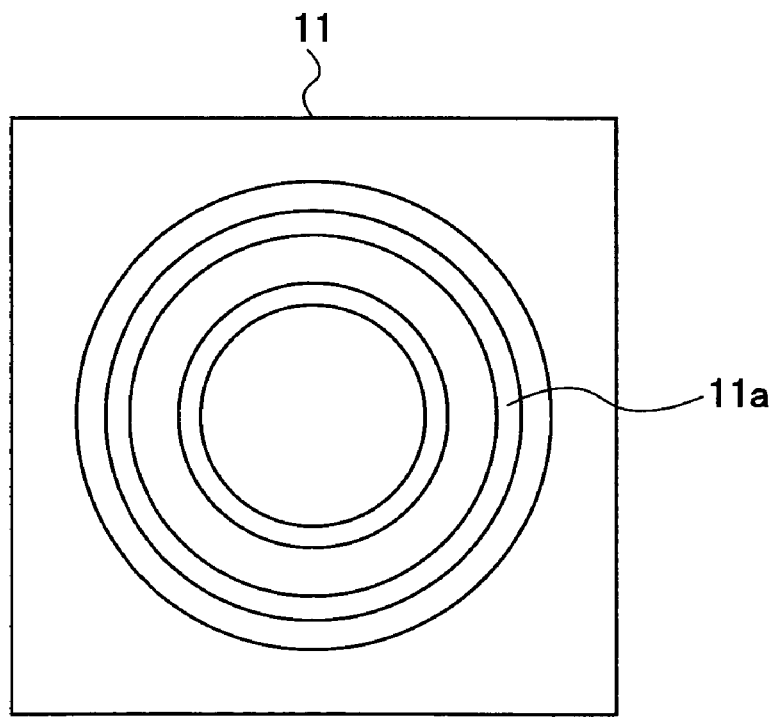
FIG. 15 is a diagram showing an electrode pattern for compensating residual aberration created in a wavelength selection phase plate according to an embodiment of the present invention.

The liquid crystal layer 10 includes a plurality of cells 10a, in which the cells 10a are provided in correspondence with widths of the areas of the changing levels of the wavelength selection phase plate 12. That is, the width of each level of the wavelength selection phase plate 12 is same as the width of the corresponding cell 10a of the liquid crystal layer 10. The cells may also be set as the pattern for the opposing electrode layer 11. An example of the opposing electrode layer 11 is shown in FIG. 15. In this case also, the width of each cell 11a is the same as the width of the corresponding level of the wavelength selection phase plate 12.

Accordingly, in a case where a bundle of rays is incident from the light source 3, a wavefront aberration that is opposite to the direction of the residual aberration occurring in the wavelength selection phase plate 12 can be provided to each area (each cell 10a or each cell 11a). The electrode layer 9 and the opposing electrode layer 11 form a pair of electrode layers having the liquid crystal layer 10 disposed therebetween. Thus structured, the liquid crystal layer 10 is driven and controlled according to the applied voltage from the liquid crystal part driving apparatus 13.

Figure 4:
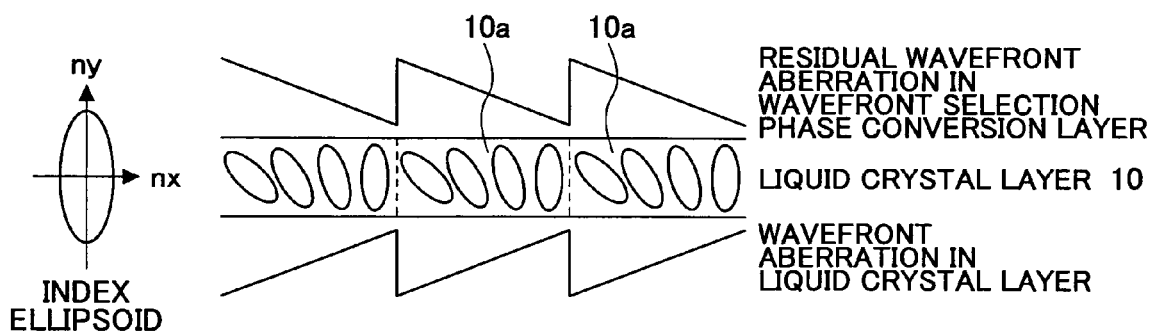
FIG. 4 is a schematic diagram showing a disposition (direction) of elements of a liquid crystal cell in a liquid crystal layer according to an embodiment of the present invention.
Figure 5:
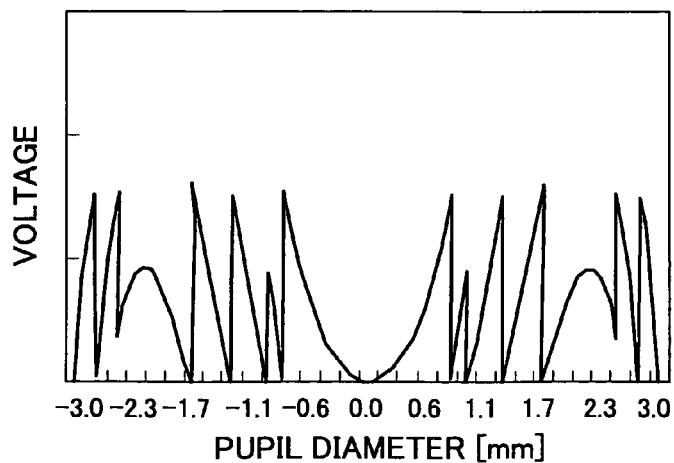
FIG. 5 is a diagram showing different voltages applied to each of the areas of a liquid crystal layer according to an embodiment of the present invention.

FIG. 4 is a diagram for showing the disposition (direction) of liquid crystal elements in relation to the residual aberration occurring in the wavelength selection phase plate 12 and the respective cells 10a or 11a of the liquid crystal layer 10. The distribution of the refractive index of the liquid crystal layer 10 changes by changing the disposition of the liquid crystal elements of the liquid crystal layer 10 for eliminating the residual aberration occurring in the wavelength selection phase plate 12. Here, the disposition of the liquid crystal elements is shown in FIG. 4 where an index ellipsoid is indicated with refractive indexes of nx, and ny. Upon transmission through the liquid crystal layer 10, the phase of the bundle of rays (i.e. wavefront) changes, to thereby enable elimination of the residual aberration occurring in the wavelength selection phase plate 12.

Figure 17:
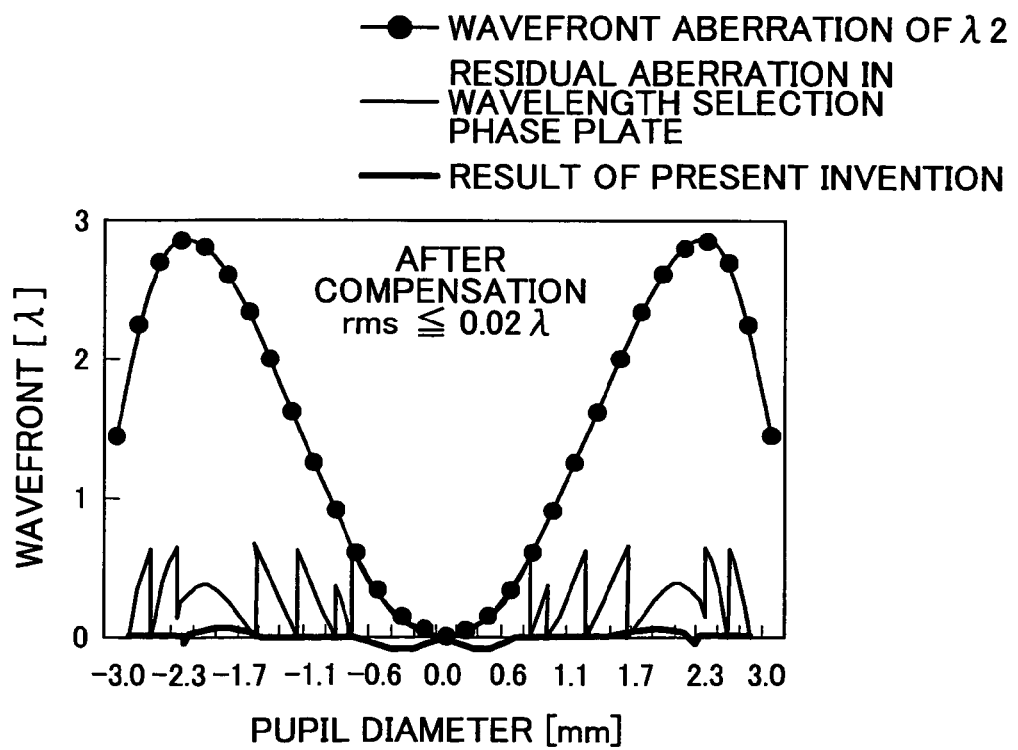
FIG. 17 is a diagram showing a result of compensating residual aberration in a case of using a wavefront aberration compensation element according to an embodiment of the present invention.

FIG. 17 is a diagram showing the results of compensating for the residual aberration with the wavefront aberration compensation element 7 according to an embodiment of the present invention. The liquid crystal layer 10 eliminates residual aberration by creating a wavefront aberration of an opposite direction with respect to the residual aberration. Accordingly, the wavefront aberration of the bundle of rays transmitted through the wavefront aberration compensation element 7 can be reduced to an rms value of 0.02 $\lambda$ or less.

Although the residual aberration in the wavelength selection phase plate 12 increases as the width (area width) of each level of the wavelength selection phase plate 12 increases, the residual aberration can be eliminated with the liquid crystal layer 10, to thereby reduce wavefront aberration. In this case, the manufacture of the wavefront aberration compensation element is easy since the width (area width) of each level of the wavelength selection phase plate 12 and the width of the corresponding cells 10a of the liquid crystal layer 10 can be increased.

Both the given wavefront aberration and residual aberration occurring in the optical pickup 1 can be compensated for at the same time. In order to do so, the electrode layer 9 (or the opposing electrode layer 11) is provided with an electrode pattern corresponding to the wavefront aberration in the optical pickup 1, and the opposing electrode layer 11 (or the electrode layer 9) is provided with an electrode pattern compensating for the residual aberration. In a case of driving the liquid crystal layer 10 with respect to the bundle of rays from the light source 3, the liquid crystal layer 10 is driven in a manner wherein the electrode pattern in the opposing electrode layer is offset by the amount of the residual aberration, and thus the electrode pattern in the electrode layer 9 compensates for the wavefront aberration. Accordingly, both the given wavefront aberration and the residual aberration in the optical pickup 1 can be compensated for at the same time.

In the wavelength selection phase plate 12, the residual aberration differs depending on the area of the liquid crystal layer 10. For example, there is a four times difference in the inclination of residual aberration (λ/mm) between area a and area b shown in FIG. 3. Such a wavefront can be accurately compensated for by differently setting the gradient of the voltage applied from the liquid crystal part driving apparatus 13 to each area (each cell 10*a*) of the liquid crystal layer 10. By changing the voltage applied to respective areas of the liquid crystal layer 10 disposed between the electrode layer 9 and the opposing electrode layer 11, the amount of phase change of the wavefront aberration can be changed in correspondence with the amount of residual aberration when transmitting through each area (each cell 10*a*). Accordingly, residual aberration can be further restrained.

Figure 16:
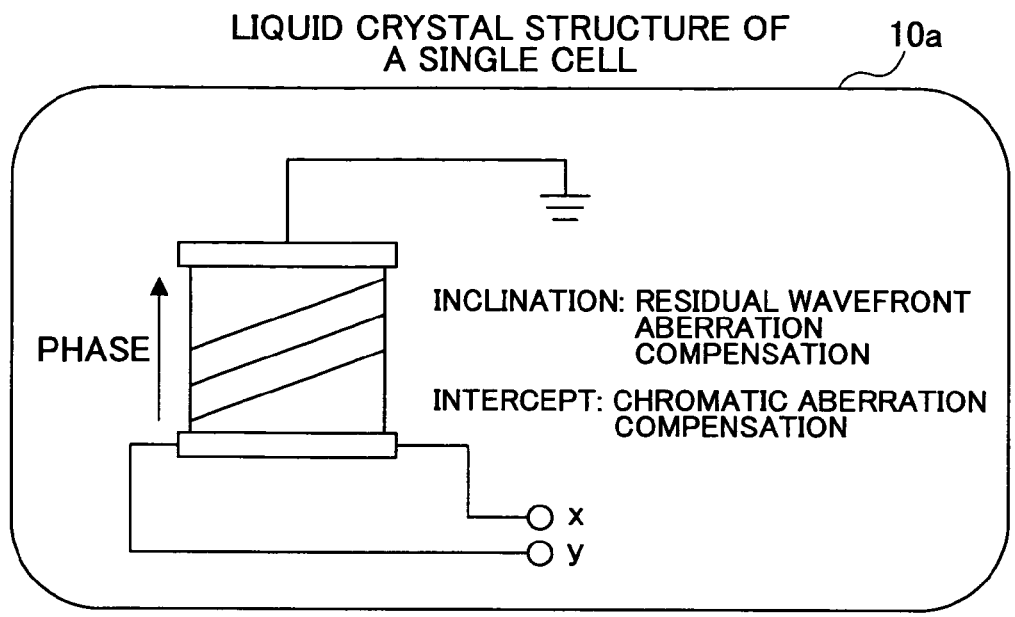
FIG. 16 is a diagram showing an example of a liquid crystal structure of a single cell for compensating chromatic aberration and residual aberration in a wavelength selection phase plate according to an embodiment of the present invention.

As described above, the wavelength selection phase plate 12 is formed mainly of glass or plastic. Accordingly, since the depth d of the wavelength selection phase plate 12 is fixed, the refractive index is changed when the wavelength of the light source deviates from a predetermined wavelength, thereby causing chromatic aberration. Although a semiconductor laser is typically used as the light source, the wavelength of the semiconductor laser fluctuates depending on manufacture lot or ambient temperature change. Such chromatic aberration can be compensated for by changing the voltage applied to the liquid crystal layer 10. Since the chromatic aberration in the wavelength selection phase plate 12 becomes a wavefront outlining the form of the wavelength selection phase plate 12, the electrode pattern provided to the electrode layer 9 is set to correspond to the width of each area of the changing levels of the wavelength selection phase plate 12. Although the electrode pattern is similar to the above-described pattern for compensating for residual aberration, the manner of applying voltage is different. That is, although a gradient voltage is applied to the cells in a case of compensating for residual aberration, a uniform voltage is applied to the cells in a case of compensating for chromatic aberration. By applying the voltages in combination, both the residual aberration and the chromatic aberration can be compensated for at the same time. This case of compensating for both the residual aberration and the chromatic aberration is described with reference to FIG. 16. The voltage applied to a single cell unit in a case of compensating for residual aberration is set by having a potential difference between x and y. The voltage applied to a single cell unit in a case of compensating chromatic aberration is set by applying an offset to the voltage of x and y. By applying such voltages at the same time, the residual aberration in the wavelength selection phase plate 12 can be compensated for while also compensating for chromatic aberration.

In a case where the voltage applied to each area (each cell 10*a*) of the liquid crystal layer 10 cannot be changed, the same results can be obtained by changing the refractive index for each area (each cell 10*a*) of the liquid crystal layer 10. In this case, the same electric wire for applying voltage to each area (each cell 10*a*) can be employed since the voltage for the electrode layer 9 and the opposing electrode layer 11 is uniform.

Furthermore, the same results can be obtained by changing the thickness of the liquid crystal layer 10 with respect to each area (each cell 10*a*) of the liquid crystal layer 10. In this case, not only the same electric wire for applying voltage to each area (each cell 10*a*) can be employed, but also the same liquid crystal material can be employed for each area (each cell 10*a*).

Figure 6:
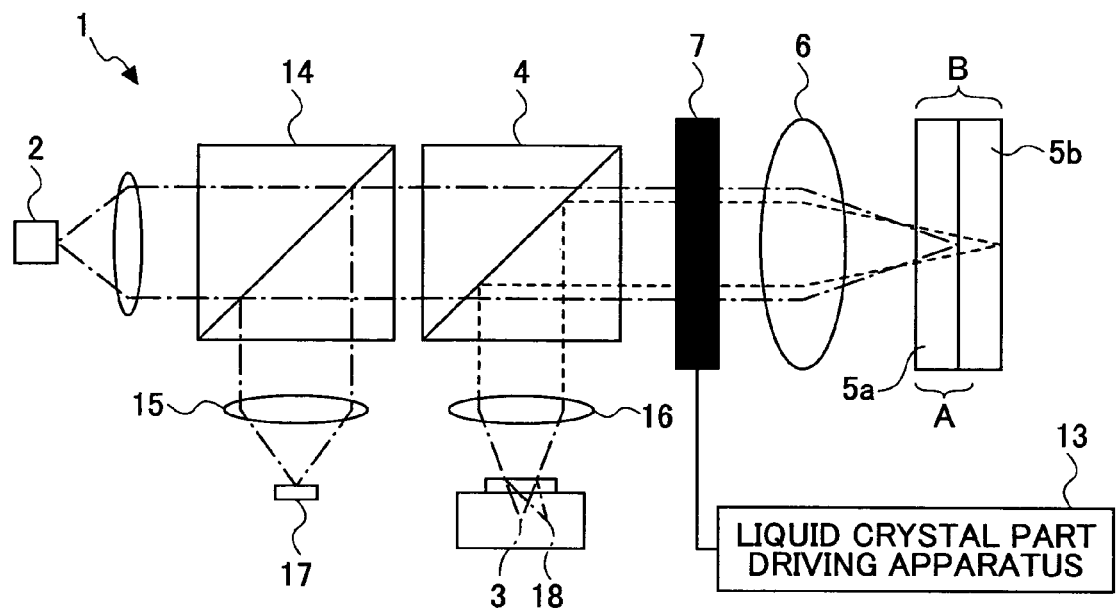
FIG. 6 is a schematic diagram showing a more specific example of an optical pickup according to an embodiment of the present invention.

Next, taking the foregoing description of the wavefront aberration compensation element 7 into account, a more practical example of the optical pickup 1 is described with reference to FIG. 6. In this case, light sources 2 and 3 having two or more different wavelengths are used. The bundles of rays emitted from the light sources 2 and 3 are directed (combined) to a single optical path by the wavelength combining prism 4 serving as an illumination optical system, are transmitted through the wavefront aberration compensation element 7, and are incident on the objective lens 6. The objective lens 6 condenses the bundles of rays so that the bundles of rays from the light source 2 is converged to form a spot on the surface of the information recording medium part 5*a* having a thickness A, and the bundle of rays from the light source 3 is converged to form a spot on the surface of the information recording medium part 5*b* having a thickness B. The light reflected from the information recording medium 5 (information recording medium part 5*a* and/or information recording medium part 5*b*) carries a signal(s) of the information recording surface(s) thereof, and is guided to receiving elements 17 and 18 by a detection/separation part (beam splitter) 14 and the wavelength combining prism 4 serving as a detection optical system, and detection lenses 15 and 16. The receiving element part may be provided separately from the light source (such as the arrangement of the light source 2 in FIG. 6) or provided integrally with the light source (such as the arrangement of the light source 3 in FIG. 6).

The objective lens is designed so as to minimize the wavefront aberration with respect to the wavelength of the light source 2 and the thickness A of the information recording medium part 5*a*. Since the phase distribution of the transmission wavefront with respect to the bundle of rays from the light source 2 does not change, the wavefront aberration from the light source 2 to the information recording medium part 5*a* having the thickness A can be sufficiently reduced. Accordingly, the spot thereof can be narrowed to a diffraction limit. Meanwhile, the wavefront aberration with respect to the light source 3 being caused by the wavelength of the light source 3 and the thickness B of the information recording medium part 5*b* can be reduced by the above-described wavefront aberration compensation element 7. Accordingly, the spot thereof can be narrowed to a point near the diffraction limit.

In this case, the wavefront aberration of each lens and prism (e.g. wavelength combining prism 4 or beam splitter 14) deteriorates when the wavelength of the light source is shortened. Therefore, the objective lens 6 is suitably designed for an optical system having short wavelength, to thereby reduce the wavefront aberration of each wavelength and obtain a satisfactory spot diameter for respective optical systems.

Furthermore, changes in the wavefront of a light source corresponding to ambient temperature changes can be detected by disposing a temperature sensor or a wavelength detection element (not shown) inside or at the periphery of the optical pickup 1. Then, by feeding back the detected changes to the liquid crystal part driving apparatus 13, the chromatic aberration in the wavelength selection phase plate 12 can be compensated for.

Figure 7:
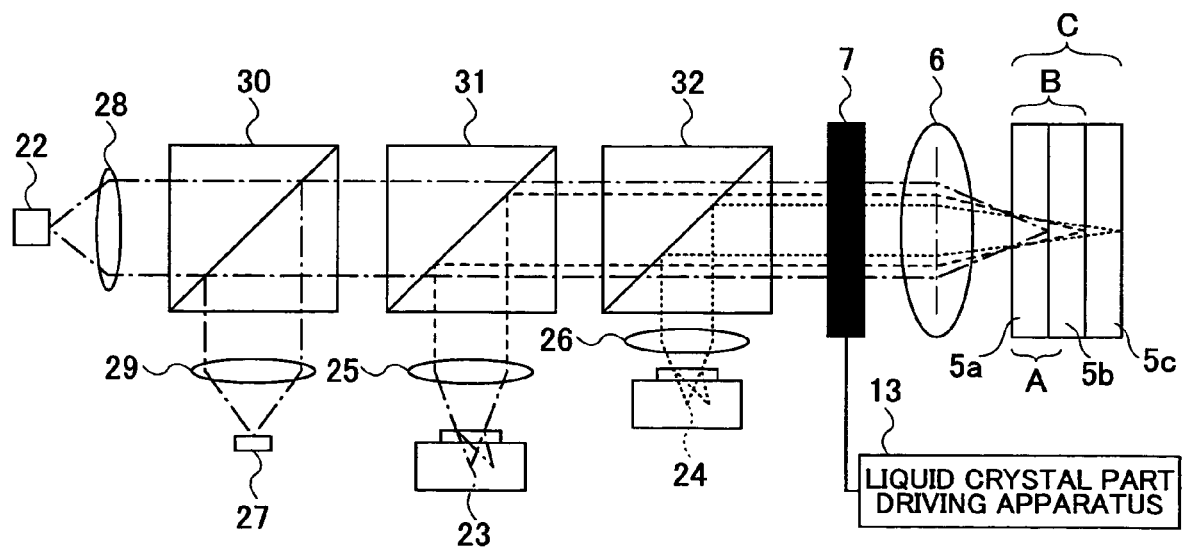
FIG. 7 is a schematic diagram showing an example of optical pickup for light sources of three wavelengths.

Next, an optical pickup 21 applied to light sources of three wavelengths according to an embodiment of the present invention is described with reference to FIG. 7. The optical pickup 21 includes a light source 22 for emitting a bundle of rays having short wavelengths ranging from 380-420 nm, a light source 23 for emitting a bundle of rays having medium wavelengths ranging from 640-680 nm, and a light source 24 for emitting a bundle of rays having long wavelengths ranging from 760-800 nm. In this example, each of the light sources 23, 24 is formed as a hologram unit being formed into a united body with diffraction elements for separating emitted/reflected light from corresponding light receiving elements by diffraction. Collimator lenses 25, 26, serving also as detection lenses, are disposed in front of the light sources 23, 24. Meanwhile, the light source 22 is formed separately from a light receiving element 27. A collimator lens 28 and a detection lens 29 are disposed on the optical path of the light source 22. A detection/separation part (beam splitter) 30, serving as a detection optical system for separating emitted light and reflected light, is disposed on the light emission path of the light source 22. Furthermore, a wavelength directing prism 31 for directing (combining) the bundle of rays from the light source 22 and the bundle of rays from the light source 23 into a same optical path is also provided. Furthermore, a wavelength combining prism 32 for directing (combining) the bundle of rays from the light sources 22, 23 and the bundle of rays from the light source 24 is also provided. An objective lens 6 is disposed at the combined optical path. A wavefront aberration compensation element 7 is disposed on the optical path between the objective lens 6 and the wavelength combining prism 32.

Here, the objective lens 6 is suitably designed for a short wavelength optical system of the light source 22 having the shortest wavelength. In this case, the wavefront aberration compensation element 7 is set so that the depths of the wavelength selection phase plate 12 are substantially twice the integral multiples (even integers) of the wavelength $\lambda 1$ of the light source 22. With respect to the bundle of rays from the light source 24 having a wavelength that is substantially twice that of $\lambda 1$, the depths of the wavelength selection phase plate 12 become integral multiples of the wavelength $\lambda 3$. Accordingly, the phase distribution of the transmission wavefront of the wavelength selection phase plate 12 does not change with respect to the light sources 22 and 24. Therefore, in a case where the light sources 22 and 24 emit, the wavefront aberration compensation element 7 according to an embodiment of the present invention has no affect on the light sources 22 and 24 by controlling transmission wavefront phase difference of the liquid crystal layer 10 to a constant level in the incident plane. Accordingly, the wavefront aberration from the light source 22 to the information recording medium part 5a having the thickness A can be sufficiently reduced. Hence, the spot can be narrowed to a diffraction limit.

Furthermore, with respect to the bundle of rays from the light source 23, the wavefront aberration generated from the wavelength of the light source 23 and the thickness B of the information recording medium part 5b can be reduced with the wavefront aberration compensation element 7 according to the above embodiment of the present invention; thereby the spot can be narrowed to a point near the diffraction limit.

Furthermore, with respect to the bundle of rays from the light source 24, the illumination optical system is set so that the bundle of rays from the light source 24 is incident on the objective lens 6 in a diffusing manner (For example, by positioning the light source 24 closer to the objective lens 6). Accordingly, the wavefront aberration caused by the wavelength $\lambda 3$ of the light source 24 and a substrate thickness C of an information recording medium part 5c can be reduced by using the wavefront aberration created by allowing the bundle of rays from the light source 24 to be incident on the objective lens 6 in a diffusing manner. Furthermore, by compensating for the residual wavefront aberration with the liquid crystal layer 10, the spot of the light source 24 can also be narrowed to a point near the diffraction limit.

Thus structured, the optical pickup having light sources of three wavelengths is able to reduce wavefront aberration with any of the combinations of light sources 22, 23, 24 and the information recording medium parts 5a, 5b, 5c, and is able to narrow the spot to a point near the diffraction limit.

Furthermore, in the optical system having the light source 23 with a medium wavelength of 640-680 nm, the optical pickup 21 can handle large deviations of the optical axis between the objective lens 6 and the incident bundle of rays by allowing the bundle of rays incident on the objective lens to become substantially parallel.

Figure 8:
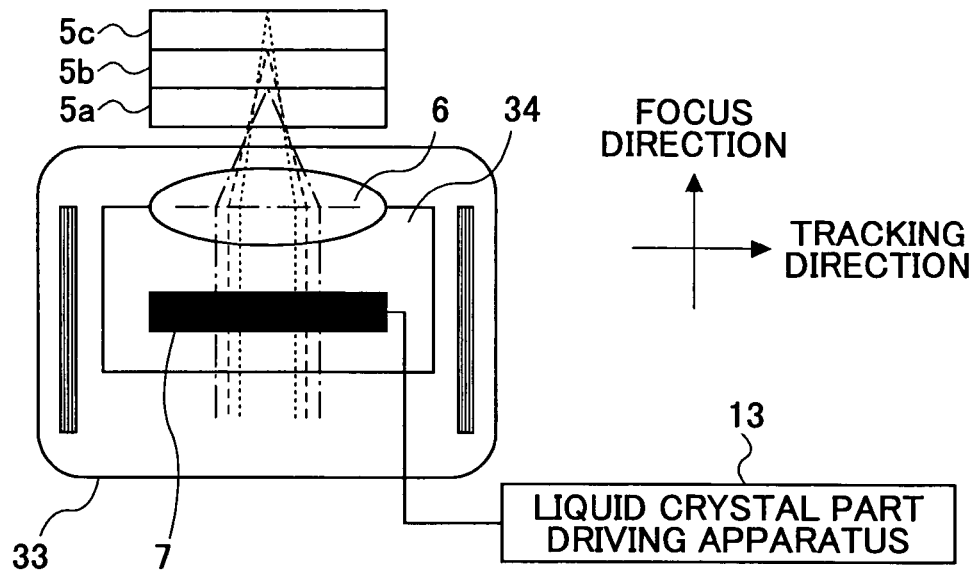
FIG. 8 is a side view showing an example of an arrangement of wavelength selection phase element having an objective lens and a liquid crystal part driving apparatus formed into a united body according to an embodiment of the present invention.
Figure 9:
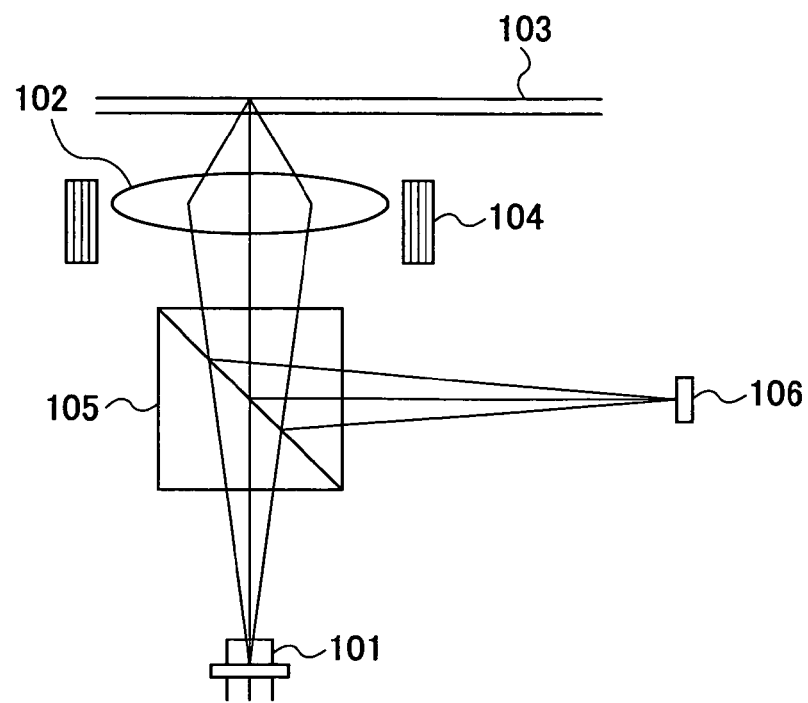
FIG. 9 is a schematic diagram showing an example of a typical optical pickup.
Figure 10:
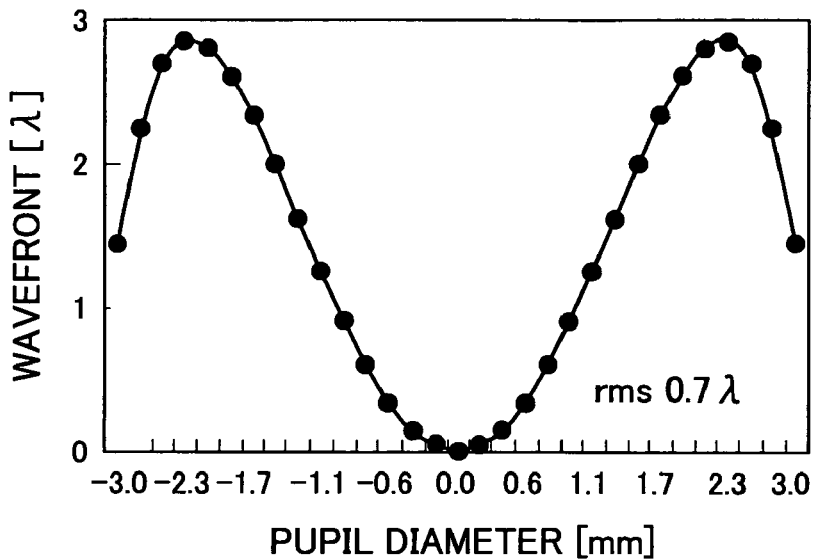
FIG. 10 is a diagram showing an example of wavefront aberration in a case of applying an objective lens for Blu-ray to a DVD.
Figure 11:
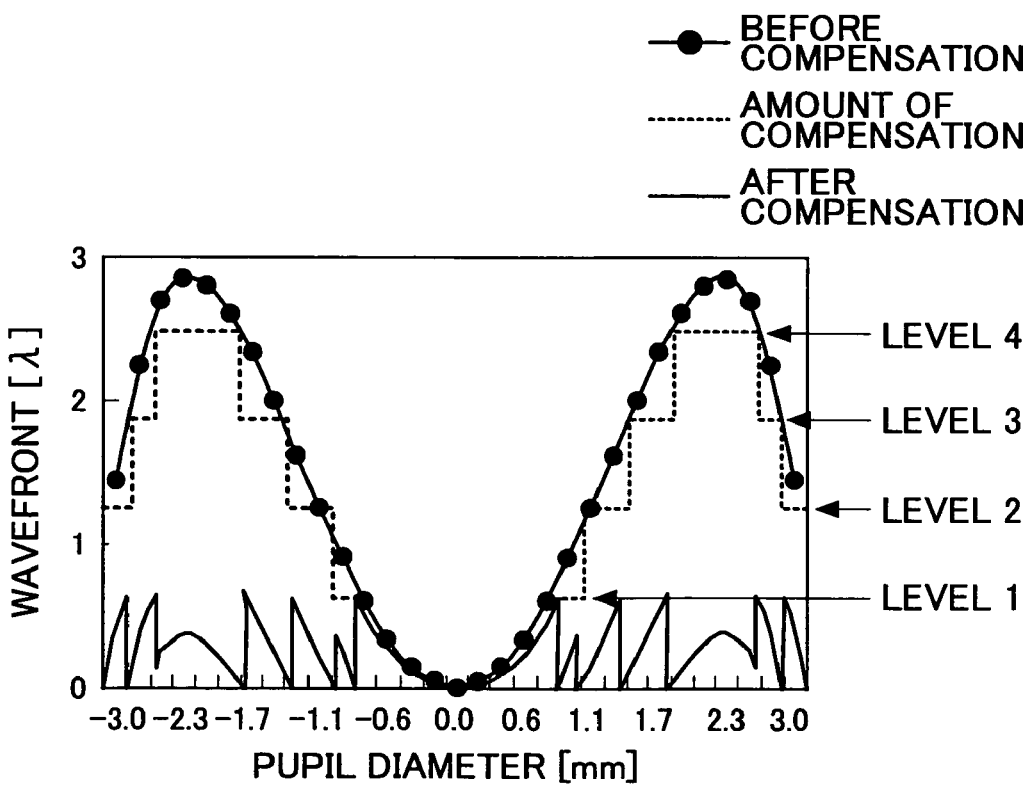
FIG. 11 is a diagram for explaining a wavefront aberration in using a conventional wavelength selection phase conversion element.
Figure 12:
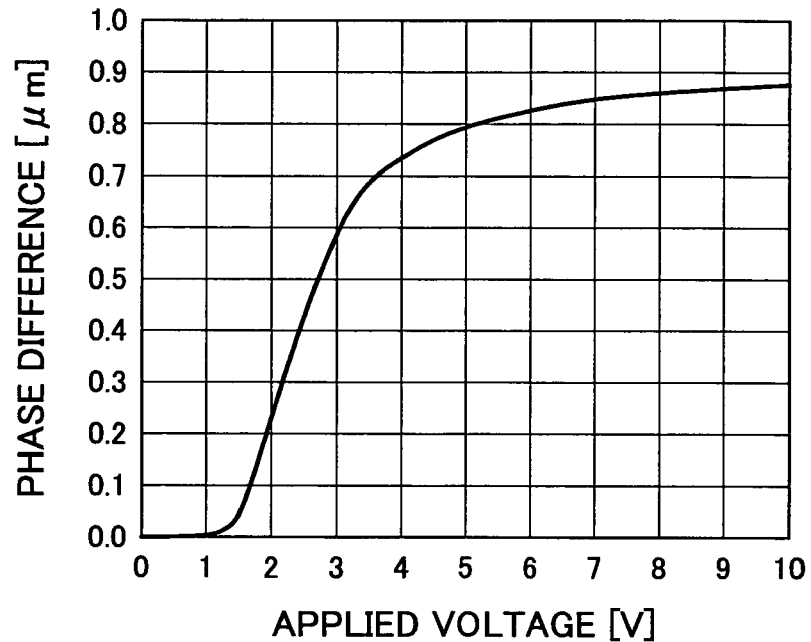
FIG. 12 is a diagram for explaining a relation between voltage applied to a liquid crystal element and phase difference.
Figure 13:
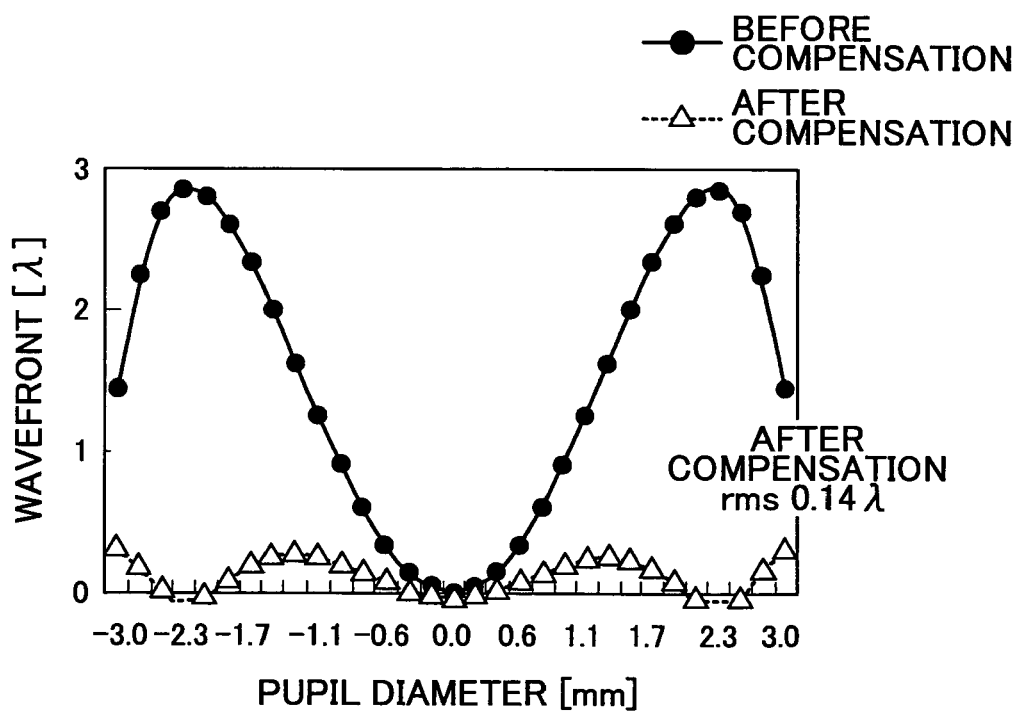
FIG. 13 is a diagram for explaining compensation of a spherical aberration by using divergent light according to a conventional example.

As shown in FIG. 8, the wavefront aberration compensation element 7 and the objective lens 6 according to an embodiment of the present invention are formed in a united body with a moving part 34 of an actuator 33 for performing a focusing/tracking operation. Thus structured, deviation of the optical axis between the objective lens and the wavefront aberration compensation element 7 can be restrained. Therefore, deterioration caused by the deviation of the optical axis can be prevented, and a satisfactory spot diameter can be obtained.

Furthermore, the weight of the actuator 33 may be reduced by disposing the wavefront aberration compensation element 7 in the optical path of the illumination optical system 4 which is not included in the moving part of the actuator 33. In this case, the deterioration of the wavefront aberration caused by the deviation of the optical axis during the tracking operation of the actuator 33 is compensated for by the liquid crystal layer 10 disposed in the wavefront aberration compensation element 7.

In consequence, with the optical disk apparatus having the optical pickup 1 according to an embodiment of the present invention, the spot on the information recording medium 5 can be suitably narrowed, and an optical disk apparatus performing high quality recording/reproduction/erasing can be obtained.

Further, the present invention is not limited to these embodiments, but various variations and modifications may be made without departing from the scope of the present invention.

The present application is based on Japanese priority applications Nos. 2003-346674, and 2004-201767 filed on Oct. 6, 2003, and Jul. 8, 2004, respectively, with the Japanese Patent Office, the entire contents of which are hereby incorporated by reference.

What is claimed is:

1. A wavefront aberration compensation element comprising:
   a wavelength selection phase plate having a plurality of phase steps of various widths and various thicknesses at various areas;
   a liquid crystal layer for obtaining a prescribed wavefront aberration; and
   a pair of first and second electrode layers having the liquid crystal layer disposed therebetween, wherein either one of the wavelength selection phase plate and the pair of first and second electrode layers having the liquid crystal layer disposed therebetween is stacked on the other, wherein a phase step of a single area of the wavelength selection phase plate satisfies a relation of "nd=mλ1" with respect to a light beam of a predetermined wavelength, wherein "d" represents the phase step of a single area of the wavelength selection phase place, "λ1" represents the light beam of a predetermined wavelength, "n" represents a refractive index and "m" represents a given integral number, wherein the liquid crystal layer comprises a plurality of liquid crystal cells arranged in correspondence with the widths of the plurality of phase steps in the wavelength selection phase plate such that a width of each of the plurality of liquid crystal cells is substantially the same as the width of the corresponding one of the plurality of phase steps in the wavelength selection phase plate, and wherein the liquid crystal layer provides a wavefront aberration in an opposite direction with respect to a residual aberration generated by a light transmittal through the wavelength selection phase plate.

2. The wavefront aberration compensation element as claimed in claim 1, wherein the liquid crystal layer is arranged in correspondence with the various areas in the wavelength selection phase plate, and provides a wavefront aberration in an opposite direction with respect to a chromatic aberration generated by deviation of a wavelength of a light transmitted through the wavelength selection phase plate.

3. The wavefront aberration compensation element as claimed in claim 1, wherein different amounts of voltages are applied to the liquid crystal layer disposed between the pair of the first and second electrode layers in correspondence with the various areas of the wavelength selection phase plate.

4. The wavefront aberration compensation element as claimed in claim 1, wherein the liquid crystal layer has a refractive index which differs in correspondence with the various areas of the wavelength selection phase plate.

5. The wavefront aberration compensation element as claimed in claim 1, wherein the liquid crystal layer has a thickness which differs in correspondence with the various areas of the wavelength selection phase plate.

6. An optical pickup comprising:
a plurality of light sources for emitting luminous fluxes of various wavelengths;
an objective lens for condensing a band of rays of the luminous flux onto an information recording medium;
an illumination optical system for combining the luminous flux emitted from each of the light sources and converging the luminous fluxes to the objective lens;
a receiving element for detecting light reflected from the information recording medium;
a detection optical system for guiding the reflected light to the receiving element; and
a wavefront aberration compensation element disposed in an optical path between the objective lens and the illumination optical system, the wavefront aberration compensation element including a wavelength selection phase plate having a plurality of phase steps of various widths and various thicknesses at various areas, a liquid crystal layer for obtaining a prescribed wavefront aberration, and a pair of first and second electrode layers having the liquid crystal layer disposed therebetween, wherein either one of the wavelength selection phase plate and the pair of first and second electrode layers having the liquid crystal layer disposed therebetween is stacked on the other, wherein a phase step of a single area of the wavelength selection phase plate satisfies a relation of "nd=mλ1" with respect to the light beam of a predetermined wavelength, wherein "d" represents the phase step of a single area of the wavelength selection phase plate, "λ1 represents the light beam of predetermined wavelength, "n" represents a refractive index, and "m" represents a given integral number, wherein the liquid crystal layer comprises a plurality of liquid crystal cells arranged in correspondence with the widths of the plurality of phase steps in the wavelength selection phase plate such that a width of each of the plurality of liquid crystal cells is substantially the same as the width of the corresponding one of the plurality of phase steps in the wavelength selection phase plate, and wherein the liquid crystal layer provides a wavefront aberration in an opposite direction with respect to a residual aberration generated by a light transmittal through the wavelength selection phase plate.

7. The optical pickup as claimed in claim 6, further comprising:
a wavelength detection element disposed in at least one of the illumination optical system and the detection optical system for detecting an amount of change of a wavelength of the light source; and
a liquid crystal control part for controlling a driving amount of the liquid crystal layer in the wavefront aberration compensation element in correspondence with an output of the wavelength detection element.

8. The optical pickup as claimed in claim 6, wherein the wavelength selection phase plate of the wavefront aberration compensation element is set to allow a phase distribution of a transmission wavefront to change only with respect to the luminous flux having a longer wavelength among the luminous fluxes having two or more different wavelengths.

9. The optical pickup as claimed in claim 6,
wherein the luminous flux emitted from the light sources include a luminous flux with a short wavelength of 380-420 nm, a luminous flux with a medium wavelength of 640-680 nm, and a luminous flux with a long wavelength of 760-800 nm,
wherein the wavelength selection phase plate of the wavefront aberration compensation element is set to allow a phase distribution of a transmission wavefront to change with respect to the luminous flux with the medium wavelength, but not with respect to the luminous flux with the short wavelength or the luminous flux with the long wavelength, and
wherein the illumination optical system for the luminous flux with the long wavelength is set to allow the luminous flux with the long wavelength to be incident on the objective lens in a diverging manner.

10. The optical pickup as claimed in claim 9, wherein the liquid crystal layer of the wavefront aberration compensation element compensates for a spherical aberration with respect to the luminous flux with the long wavelength being incident on the objective lens.

11. The optical pickup as claimed in claim 9, wherein the illumination optical system for the luminous flux with the long wavelength is set to allow the luminous flux with the long wavelength to be incident on the objective lens in a substantially parallel manner.

12. The optical pickup as claimed in claim 6, further comprising an actuator moving part for driving the objective lens in a focus direction and a tracking direction, the actuator moving part being formed into a united body with the wavefront aberration compensation element and the objective lens.

13. The optical pickup as claimed in claim 12, wherein the wavefront aberration compensation element is disposed in an optical path of the illumination optical system which is not included in the actuator moving part.

14. An optical disk apparatus comprising:

the optical pickup as claimed in claim 6.

* * * * *